Jan. 26, 1971   J. L. LEVASSEUR   3,559,173
APPARATUS FOR AUTHENTICATING HOLDERS OF CARD
IDENTIFICATION SYMBOLS
Filed Aug. 22, 1966   4 Sheets-Sheet 2
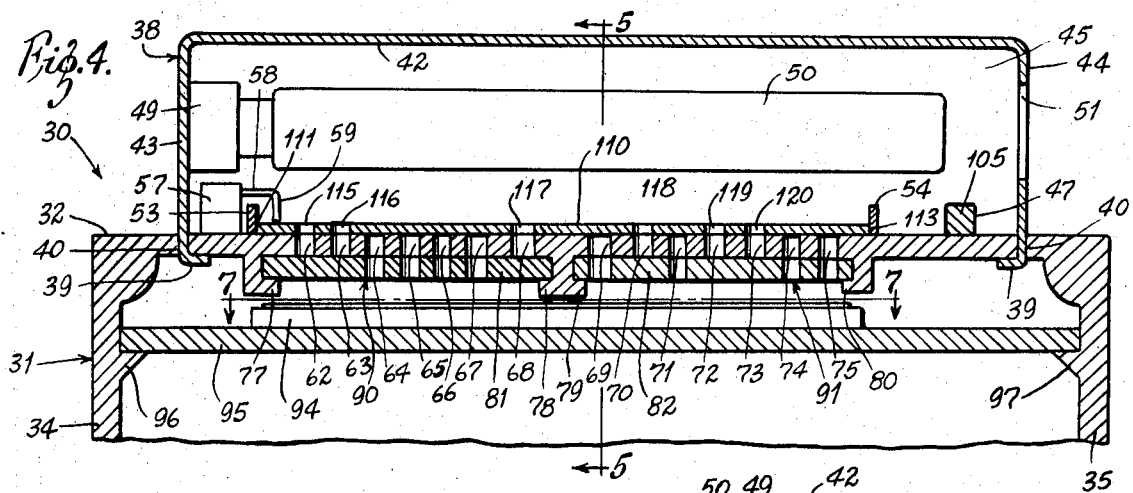
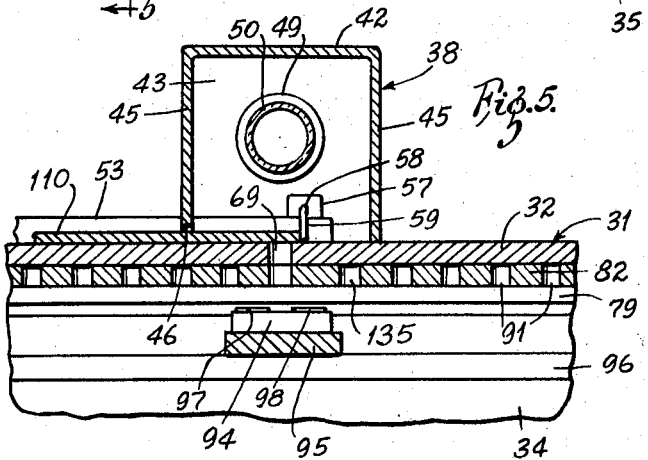
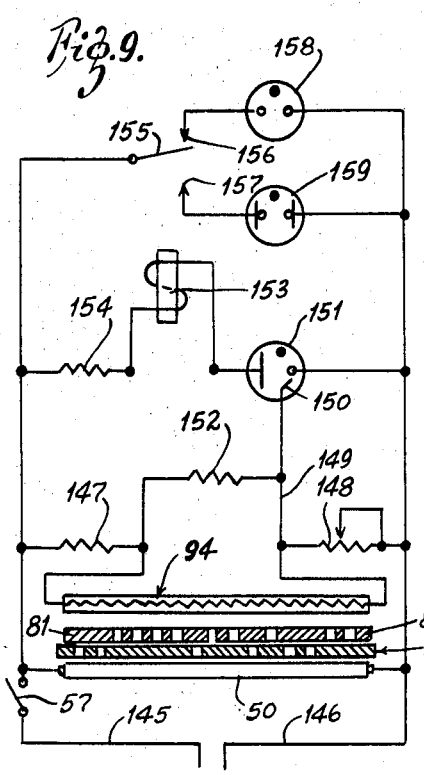
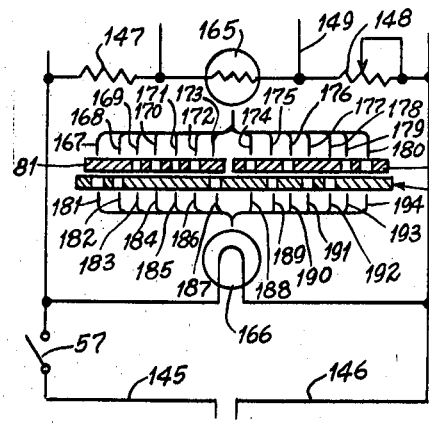
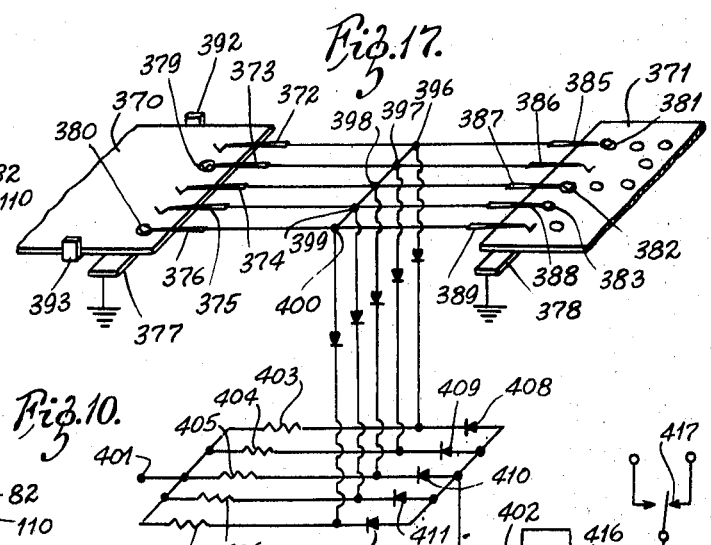
INVENTOR:
JOSEPH L. LEVASSEUR,
BY Kingsland, Rogers, Ezell, Eilers & Robbins
ATTORNEYS

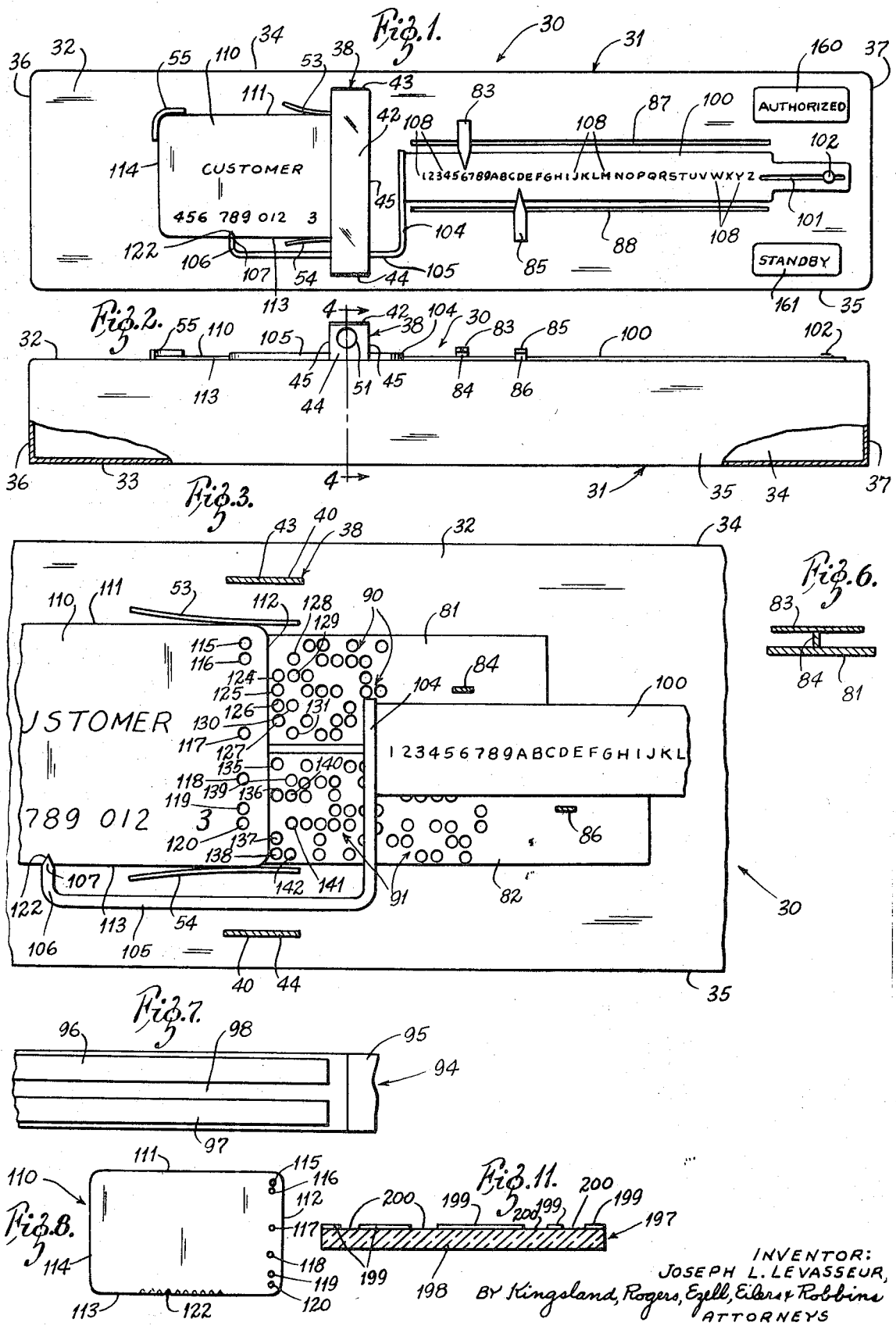

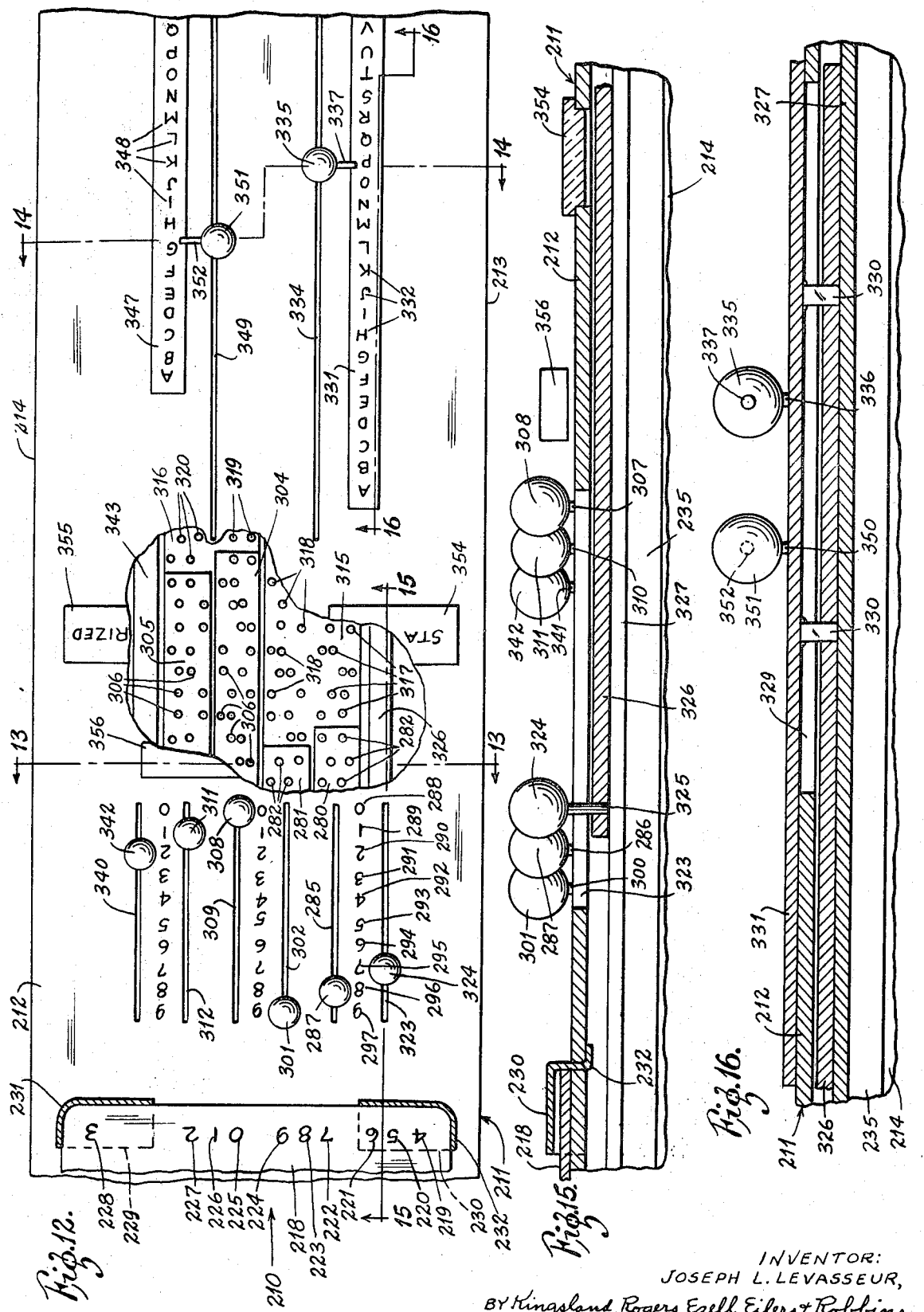

INVENTOR:
JOSEPH L. LEVASSEUR,
BY Kingsland, Rogers, Ezell, Eilers & Robbins
ATTORNEYS

United States Patent Office 3,559,173
Patented Jan. 26, 1971

3,559,173
APPARATUS FOR AUTHENTICATING HOLDERS OF CARD IDENTIFICATION SYMBOLS
Joseph Leo Levasseur, St. Louis, Mo., assignor to Simcom Corporation, High Ridge, Mo., a corporation of Missouri
Filed Aug. 22, 1966, Ser. No. 580,135
Int. Cl. H04q 3/00
U.S. Cl. 340—149        9 Claims

ABSTRACT OF THE DISCLOSURE

An apparatus and method for authenticating holders of identification symbols having means for comparing the correspondence between variations of a plurality of codes, at least one code variation selected from an identification means held by the holder, and another code variation selected as a function of an authorization code submitted by the holder. The identification means may include any alpha-numeric combination assigned to the holder by which the holder identifies himself from among others holding other alpha-numeric combinations, such as a credit card. The authorization code may include an alpha-numeric combination committed to memory and submitted orally by the holder.

---

In brief, this invention contemplates the usual assignment of identification characters, such as numbers and/or alphabet letters, to a group of holders. The identification characters assigned to each holder are in different combination, as is also usual. Such assigned identification characters are sometimes referred to herein as" identification means" and are usually set forth on a card or the like which is subject to being lost or stolen or somehow getting into the hands of a person to whom the identification means was not originally assigned. To determine the authority of a holder to submit the identification means and to protect against its use by unauthorized persons, a code character or combination of code characters, such as numbers and/or alphabet letters are also assigned to the authorized holder of the identification means. The code characters are not set forth on the identification card, but are committed to the memory of the holder. When the holder submits his identification means for goods, services or other purposes, he also submits his secret code character orally.

This authorization apparatus stores recorded code information and selects parametric bases from among the code information according to the characters of the holder's identification means, and thereafter establishes the selected code for comparison with the secret code submitted by the holder.

Heretofore there have been various techniques for encoding an identification means for the purpose of insuring its authenticity and for determining the submitter's right of possession. Since "hidden" encoding is usually detectable by those skilled in the art, an effective system depends upon the degree of difficulty in deciphering the encoded information. Deciphering a complex code technique is often limited to making many comparisons in conjunction with segments of known information, requiring elaborate and expensive apparatus which only large concerns can afford. The practical and economic considerations in providing a system with the necessary effectiveness has heretofore been a deterring factor in the use of code verification of the authority of a holder to hold an identification means.

An object of this invention is to provide apparatus having recorded code information for verifying the authority of a holder to submit an identifying means by comparing code characters assigned only to the authorized holder, with the recorded code information wherein the apparatus is of simple and inexpensive construction, compact, and easy to operate, and yet the code cannot be deciphered.

A prominent feature of one embodiment of this invention is that it utilizes an identification means which is encoded in such a way that a number of cards possessing the identical code combination will bear no resemblance upon comparison; the use of a code character more than once in the combination will not be apparent; and a number of cards having similar code configurations will not have the same combination. An object of the invention is to provide apparatus which utilizes such an identification means.

A further object of this invention is to provide authorization apparatus wherein existing credit cards or identification characters can be used with apparatus incorporating the principles of this invention, whereby authorization is accomplished without the need to encode, or to change in any way, the identification means already in existence.

The possession authorization apparatus described hereafter finds special application in credit, identification, security, and equipment utilization systems. This system also provides a secure feeling for the subscriber of the identification means in that its loss will not result in another's usage thereof.

It is an object of this invention to provide a new and improved possession authorization apparatus.

Another object of this invention is to provide possession authorization apparatus which utilizes an identification means that is encoded in such a manner as to defy deciphering even by comparison techniques.

Another object of this invention is to provide possession authorization apparatus which utilizes an identification means that is perforated in accordance with a shifting, constant ratio code technique and which decodes said constant ratio code to verify the alpha-numeric combination given by the submitter of said identification means.

Another object of this invention is to provide possession authorization apparatus which will function via ordinary communications or without the need to encode and sense the identification means, by determining the authorizing code combination indirectly from the existing numbers on said identification means and by comparing it to the code combination indicated by the submitter.

A further object of this invention is to provide possession authorization apparatus which utilizes a code system that permits numerous and random code changes.

A further object of this invention is to provide possession authorization apparatus which utilizes a very efficient and trouble-free code verification technique.

Another object of this invention is to provide authorization apparatus for authenticating the holder of an alphanumeric combination whether the identifying combination is submitted by card or orally. For example, according to one embodiment of the invention, this apparatus will function whether the holder submits an identification card, such as for charging merchandise, or supplies his identification combination orally, such as his telephone credit numbers to a telephone operator, and authorization will be verified only if the holder also submits the proper code symbols assigned with the identification combination.

In the realization of the above objects, one embodiment of the possession authorization apparatus comprises in combination, an identification means in the form of a card which is perforated at one end with two constant-radio (such as 3-out-of-7) codes that are independently and randomly assigned to two groups of alpha-numeric characters (thirty-five in numbers for a 3-out-of-7 code) and having a notch in one of several possible positions along the adjacent edge which positions a movable dial displaying the thirty-five characters. Means to select the submitted secret code character combination comprises two dial pointers which serve to move two perforated plates that are side by side and coded opposite to the code on the identification means (such as 4-out-of-7). The perforated plates are superimposed beneath the perforations along the end of the card. The authorization apparatus has means to optically sense the superimposed perforations and to indicate that the total (14) light paths are blocked when the exact authorizing combination is given. Any other setting of the dial pointers results in the passage of light through one or more of the paths, and a negative authorization.

In another form of the invention, the possession authorization apparatus comprises in combination six numerical selectors that are positioned in conformance with six of the numbers on the identification means. Four of the selectors position two pairs of perforated code plates using a 2-out-of-4 code, and two of the selectors position two alpha-numeric dials. Each pair of code plates creates a dual 2-out-of-4 code which provides exactly the thirty-six variations required for each alpha-numeric group. Means to indicate the submitted character combination of the alpha-numeric dials comprise two pointer knobs which position two oppositely perforated code plates containing the dual 2-out-of-4 code. Means to superimpose the two pairs of encoding plates with the two oppositely perforated code plates and means to optically sense the sixteen possible light paths. Finally, means to indicate that all light paths are blocked, thus authorizing possession to the submitter of the identification means.

A more complete understanding of the invention, together with other features, objects and embodiments thereof will be apparent by reference to the following description taken in conjunction with the accompanying drawings, in which:

FIG. 1 is a top plan view of the possession authorization apparatus with the identification means in position to be read, together embodying one form of the present invention;

FIG. 2 is a side elevational view of said apparatus;

FIG. 3 is an enlarged partial top plan view of a portion of the apparatus illustrating the relationships of the alpha-numeric dial, identification means, and oppositely perforated code plates;

FIG. 4 is an enlarged sectional view along the line 4—4 of FIG. 2 with the identification means in place;

FIG. 5 is a sectional view taken along the line 5—5 of FIG. 4;

FIG. 6 is a detail sectional view of a code plate and its pointer;

FIG. 7 is a top plan view of a portion of the photocell that is used to sense the light paths, the view being taken as indicated by line 7—7 in FIG. 4;

FIG. 8 is a plan view of an identification card;

FIG. 9 is a schematic circuit diagram of the optical sensing and visual indication means;

FIG. 10 is a modified schematic circuit diagram of the optical sensing and visual indicating means;

FIG. 11 is an enlarged sectional view of a modified code plate construction;

FIG. 12 is a fragmentary top plan view of an alternate embodiment of the possession authorization apparatus, with the enclosure partly cut away to reveal a portion of the internal parts;

FIG. 15 is an enlarged sectional view taken on the line 15—15 of FIG. 12;

FIG. 16 is an enlarged sectional view taken on the line 16—16 of FIG. 12; and

FIG. 17 is a schematic diagram and simplified perspective view of an alternate embodiment of the possession authorization apparatus.

Figure 13:
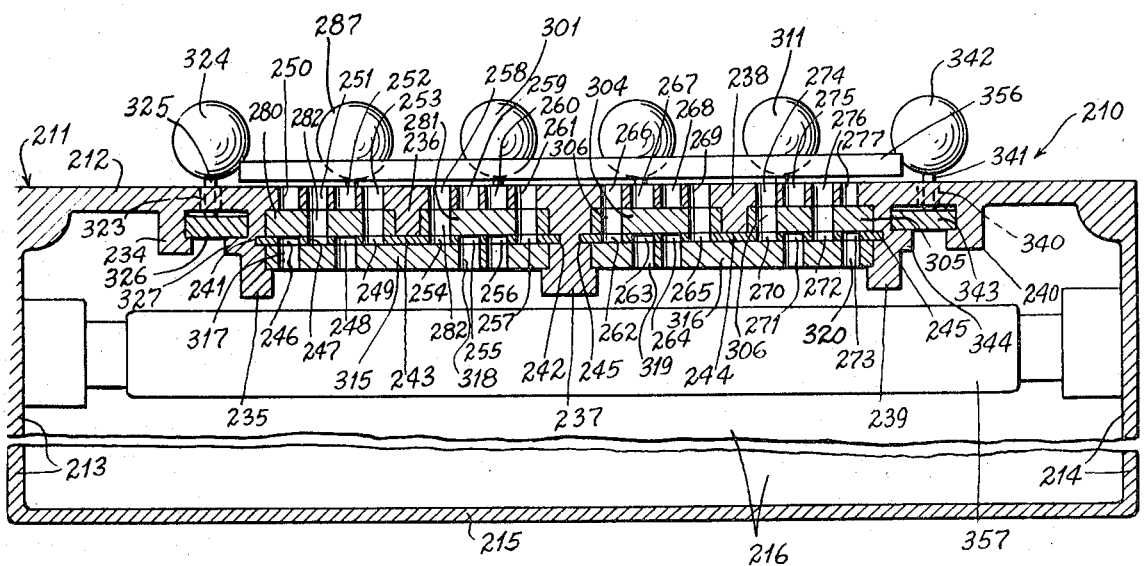
FIG. 13 is an enlarged sectional view along the line 13—13 in FIG. 12 showing the encoding plates in relation to the other components of the apparatus.

One form of authenticating apparatus contemplated by the present invention is shown in FIGS. 1–5. This authenticating apparatus 30 has a housing or enclosure 31 having a top wall 32, a bottom wall 33, side walls 34 and 35, and end walls 36 and 37. The housing 31 may be formed by any suitable means of any suitable material, but it is preferably extruded or molded of plastic or aluminum with the end walls 36 and 37 permanently welded or otherwise sealed in place after the internal parts to be described have been installed.

A lamp enclosure 38 is mounted on the top wall 32 of the housing 31. This mounting may be by means of tabs 39 extended through opposed slots 40 in the top wall 32, and then bent over and welded or otherwise permanently sealed against the underside of said wall, as shown in FIG. 4. The lamp housing 38 has a top wall 42, side walls 43 and 44, and an end wall 45 that extends from the top wall 42 to the surface of the top 32 of the housing 31. Another end wall 45 extends from the top wall 42 but has a lower edge 46 spaced above the wall 32 of the housing 31. There is a small opening 47 through the end wall 45 for a purpose to be described.

A lamp socket 49 is mounted against the side wall 44 of the lamp housing 37 and receives a tubular lamp 50. A hole 51 through the other side wall 43 of the lamp housing 37 provides access for changing the lamp 50.

Credit card positioners 53, 54 and 55 are permanently mounted to and project upwardly from the top 32 of the housing 31. A microswitch 57 is mounted within the light enclosure 38. The microswitch 57 has a switch arm 58 that extends over the credit card guide 53 and has a downwardly projecting finger 59.

There are two rows of holes through the top wall 32 of the housing 31 below the lamp 50. One row comprises seven holes 62, 63, 64, 65, 66, 67 and 68. The other row also comprises seven holes 69, 70, 71, 72, 73, 74, and 75.

Depending from the lower side of the top wall 32 of the housing 31 are oppositely facing pairs of longitudinal tracks 77, 78, 79 and 80. The tracks 77 and 78 support and guide a slidable code plate 81 and the tracks 79 and 80 support and guide a slidable code plate 82. Since the tracks 77, 78, 79 and 80 are parallel and longitudinal, they may be formed with the extrusion of the housing 31.

As shown in FIG. 3, a pointer 83 is connected to the code plate 81 by a short rod 84, as shown in FIG. 8. Another pointer 85 is connected to the code plate 82 by a similar short rod 86. The rod connections of the pointers 83 and 85 to the code plates 81 and 82 extend through longitudinal slots 87 and 88 in the top wall 32 of the housing 31. Manual engagement of the pointers 83 and 85 permits sliding of the code plates 81 and 82 along their respective tracks 77, 78, 79, and 80. The code plate 81 has a plurality of transverse rows of holes 90 through it, and the code plate 82 has a plurality of transverse rows of holes 91 through it. The positions and functions of the holes 90 and 91 will be described hereinafter.

Within the housing 31, a photocell 94 is mounted on a plate 95 that extends between opposite longitudinal shoulders 96 and 97 projecting inwardly from the side walls 34 and 35 of the housing 31. The photocell 94 is positioned immediately below the holes 62 through 75 of the top wall 32. The photocell 94 may be of any suitable design, such as that shown in FIG. 7 wherein the photocell comprises a plate 95 having a pair of parallel electrodes 96 and 97 mounted on it and separated by a strip 98 of photosensitive material such as cadmium-sulfide. When no light reaches the photocell 94 the resistance between the electrodes 96 and 97 is high, but the resistance of the cadmium-sulfide 98 substantially decreases when exposed to light, closing the circuit between the electrodes 96 and 97.

A slidable dial in the form of a plate 100 is mounted on the upper surface of the top wall 32 of the housing 31. The plate 100 has a longitudinal slot 101 in one of its ends, and a retainer pin 102, which is affixed to the wall 32 of the housing 31, projects through the slot 101 with its head overlying the plate 100 beyond the edges of the slot 101. The pin 102 permits the plate 100 to slide between the limits of the ends of the slot 101 but prevents removal of the plate 100.

A rigid locater rod 104 is attached to the other end of the plate 100 and is bent to provide an arm 105 that passes through the hole 47 in the wall 45 of the light enclosure 37. The free end 106 of the arm 105 is bent inwardly and is formed with a V-shaped detent 107. As the rod 104 slides, the plate 100 also slides.

The plate 100 has a row of numerical and alphabetical characters 108 imprinted on it. For the code arrangement to be described, these characters 108 may conveniently comprise the numbers 1–9 and the letters A–Z. Preferably, the plate 100 and the pointers 83 and 85 have complementary detents to aid in locating the pointers 83 and 85 opposite selected ones of the numbers and letters 108.

The identification card 110 which is to be used with the authenticating apparatus 30 is shown in FIG. 8. The identification card 110 may be issued to a holder for any purpose, such as a credit card for charging merchandise, an admission pass card, and the like. The card 110 is generally rectangular having four edges 111, 112, 113 and 114 sized to fit within the positioners 53, 54 and 55 of the authenticating apparatus 30.

The card 110 has two rows of holes, one of the rows comprising three holes 115, 116 and 117 and the other row comprising three holes 118, 119 and 120. The holes 115, 116 and 117 are located at three of seven possible positions and the holes 118, 119 and 120 are located at three of seven possible positions which may be the same as or different than the location of the holes 115, 116 and 117. In other words, for each row of holes, there are seven equally spaced possible locations, and location of the holes in three of these seven possible locations provides a 3-out-of-7 code for each row of holes. Also, the edge 113 of the card 110 has a notch 122 in it. The notch 122 is located in any one of ten possible positions along the edge 113 of the card 110, the other nine positions being shown by dotted lines, each of the positions being separated by a space increment which is identical as to the space between the number and letter characters 108 on the slide plate 100. The card 110 is made of opaque material so that light can pass through it only at the holes 115–120.

The code plates 81 and 82 are provided with holes 90 and 91 arranged in a code opposite and complementary to that of the 3-out-of-7 code represented by each row of holes on the credit card 110. Thus, the holes 90 are arranged in rows, each of which constitutes four holes in four different positions out of seven possibilities, thereby providing 4-out-of-7 coding. Thus, referring to FIG. 3, there is a row of holes 124, 125, 126 and 127 in four positions of the seven possibilities and another row of holes 128, 129, 130 and 131 in four different positions of the seven possibilities. Similarly, there are additional rows of four holes each totaling thirty-five rows, all in different combinations of four possible positions out of seven.

In a 3-out-of-7 code, as in a 4-out-of-7 code, there are thirty-five possibilities. The thirty-five rows of holes in the plate 81 correspond to the thirty-five possible 3-out-of-7 variations in the row of holes in the 3-out-of-7 code on the card 110 of which the holes 115, 116 and 117 are one row. In addition, the first nine rows of holes on the code plate 81 are repeated at the opposite end of the code plate 81 for a purpose to appear.

Similarly, the code plate 82 has a plurality of rows of holes comprising a 4-out-of-7 code opposite and complementary to the 3-out-of-7 code as represented by the example of the holes 118, 119 and 120. However, the assignment of four out of seven possible locations of holes in the rows on the code plate 82 is different from that of the code plate 81 to prevent detection of two identical characters used in the code combination. As FIG. 3 shows, the code plate 82 has a row of four holes 135, 136, 137, and 138 in four of the seven possible positions followed by another row of holes 139, 140, 141 and 142 in four different positions, and so on for a total of thirty-five rows. Again, the first nine rows on the code plate 82 at one end are repeated at the other end of the code plate 82.

Without yet explaining the system by which all the holes 81 and 82 are properly aligned with the holes in the customer card 110, it should be understood that when none of the holes are aligned, no light passes from the lamp 50 to the photocell 94, whereas when any hole on the card 110 is aligned with any hole on one of the code plates 81 or 82, light will be transmitted from the lamp 50 to the photocell 94. FIG. 9 illustrates a circuit diagram for the authenticating apparatus 30 wherein the switch 57 already described is connected in one of the two conductors 145 and 146 which are connected across a standard 10 volt AC power supply. The lamp 50 is connected in the switch circuit 57 across the AC power supply and is lighted only when the switch 57 is closed. The photocell 94 is connected in series with a resistor 147 and a potentiometer 148 across the power supply. One side of the photocell 94 is connected by a conductor 149 to the starter electrode 150 of a glow discharge triode 151. A thermistor 152 compensated for environmental temperature changes. The potentiometer 148 adjusts the starter voltage of the electrode 150 so that the triode 151 will not conduct when the photocell is in its high resistance or dark condition. A relay 153 and a resistor 154 are connected in series with the triode 151. Energization of the relay 153 upon firing of the triode 151 moves a normally closed switch contact 155 from a contact terminal 156 to a contact termnal 157. When the switch 155 is in contact with the terminal 156 the relay 153 is deenergized and closes a circuit to an "authorization" indicator lamp 158. When the switch arm 155 is in contact with the terminal 157, the relay 153 is energized and closes a circuit to a "standby" indicator lamp 159.

The authorization indicator lamp 158 and the standby lamp 159 are mounted below authorization and standby windows 160 and 161, respectively, by means not shown. The windows 160 and 161 are snapped into suitable holes in the top wall 32 of the housing 31.

*In operation,* the customer's credit card 110 is inserted between the positioners 53, 54 and 55 as shown in FIG. 1. To press the card 110 against the top 32 of the housing 31, the detent point 107 of the rod 104 connected to the slide plate 100 must be positioned below the notch 122 in the card 110. Therefore, with the card positioned within the locators 53, 54 and 55, the rod 104 is slid until the card can be pressed against the top 32 with the point 107 of the rod 104 within the notch 122. When the card is thus placed, its leading edge 112 contacts and swings the switch arm 58 of the microswitch 57 closing the switch 57.

When the rod 104 was slid to align the point 107 with the notch 122, the first coded setting took place because the dial plate 100 was slid according to one of its ten possible positions, corresponding to the ten possible positions of the notch 122 in the card 110. Next, the customer reveals the two characters of the code known only to him, such as "4B." Given these secret authorization code characters, the operator slides the pointer 83 to the position opposite "4" and slides the pointer 85 to the position opposite "B." As said before, suitable complementary detents between the pointers 83 and 85 and the plate 100 facilitate positioning of the pointers 83 and 85.

Sliding of the pointers 83 and 85 slides their associated code plates 81 and 82. The positions of these code plates 81 and 82 illustrated in FIG. 3 corresponds to the positions of the pointers 83 and 85 illustrated in FIG. 1. As can be seen in FIG. 3, the correct row of holes 124–127 in the code plate 81 complementary to the holes 115–117 in the card 110 are two rows away from the holes in the card. Hence, it can be seen that moving the pointer 83 from the position opposite "6" as shown in FIG. 1 to a position opposite "4" will align the row of holes 124–127 with the row of holes 115–117. This will cause all three of the holes 115–117 to be blocked. Any other position of the code plate 81 has at least one hole through it aligned with one of the holes 115–117 and light would not be blocked.

Likewise, it can be seen from FIG. 3 that movement of the pointer 85 from the "E" position illustrated in FIG. 1 to the "B" position will move the four holes 135, 136, 137 and 138 in the code plate 82 to alignment with the areas between the holes 118, 119 and 120, and all three of the holes 118, 119 and 120 in the card 110 will be blocked from transmitting light from the lamp 50. Therefore, no light is transmitted from the lamp 50 to the photocell 94, and the circuit illustrated in FIG. 9 causes the lamp 158 to be lighted, illuminating the "authorized" window 160 in the housing 31. Therefore, the customer having given the proper code characters to be set by the dial pointers 83 and 85, the operator knows that the customer is authorized to hold the card 110.

With the two code plates 81 and 82 each having thirty-five possible variations, there are a total of one thousand two hundred twenty-five possible variations. This is further increased by the location of the notch 122 which gives ten possible positions of the slide plate 100, resulting in a total of twelve thousand two hundred fifty possible variations of the code.

The variations could be increased by adding another code plate like the plates 81 and 82 and adding associated holes in the customer's card 110. To provide more space for additional holes, all the holes could be located along one of the longer edges 111 or 113 of the card 110. (The apparatus 30 would, of course, be modified to receive the longer edge of the card 110.) Also, the number of notches 122 may be varied to vary the different positions possible for the slide plate 100.

FIG. 10 illustrates a modification of the authorization apparatus 30 which permits the use of a standard commercial photocell 165 instead of the elongated photocell 94 illustrated in FIG. 7. Also, FIG. 10 shows how a smaller light bulb 166 may be used instead of the elongated tube 50. To use the photocell 165 (light) wires 167, 168, 169, 170, 171, 172 and 173 lead from the photocell 165 and terminate at the seven positions which constitute possible locations for the holes in the code plate 81. Similarly, light wires 174, 175, 176, 177, 178 179 and 180 lead from the photocell 165 and terminate opposite the seven possible positions or locations for the holes in the code plate 82. These light wires 167–180 function in the manner known in the art to direct light received by them to the photocell 165.

For the lamp 166, there are light wires 181, 182, 183, 184, 185, 186, and 187 leading from the lamp 166 to the seven possible locations of holes in one of the rows of holes on the credit card, and there are light wires 188, 189, 190, 191, 192, 193 and 194 leading from the lamp 166 to the seven possible locations of holes in the other row on the credit card 110.

FIG. 11 illustrates a modified construction of the code plates 81 and 82. The code plate 197 of FIG. 11 comprises a plate body 198 of transparent material such as acrylic sheeting, coated on one side with an opaque paint coating 199 over all areas of the upper surface of the plate 98 except for spots 200 having locations corresponding to the 4-out-of-7 coating represented by the holes 90 in the code plate 81 and the holes 91 in the code plate 82.

It is easy to change the secret code assignments which the customer gives to identify the settings for the pointers 83 and 85. This is done by removing the pointers 83 and 85 and reversing one or both of the code plates 81 and 82 by turning it 180 degrees about either its longitudinal axis or its transverse axis. This provides sixteen variations of codes from only two code plates, 81 and 82. When the change in orientation of code plates 81 and 82 has been completed, the pointers 83 and 85 are replaced. To facilitate this change in orientation of the code plates 81 and 82, one of the ends or sides of the housing 31 must be removable and, preferably, the rods 84 joining the pointers 83 and 85 to the code plates 81 and 82 should be thickened and attached to the code plates 81 and 82 by screws accessible from beneath the code plates 81 and 82.

FIGS. 12–16 illustrate another authorization apparatus which may be used on conventional credit cards having numbers on them representing the customer's established credit number. In this authorization apparatus 210, there is a housing 211 comprising a top wall 212, side walls 213 and 214, and a bottom wall 215. There are also end walls, one end wall 216 being shown in FIGS. 13 and 13. This housing 211 may also be extruded or molded with the end walls thereafter permanently secured. The credit card 218, which is to be authorized by the authorization apparatus 210, has the usual credit card numbers 219, 220, 221, 222, 223, 224, 225, 226, 227, and 228, but since only six of these characters 222–227 are to comprise references for the authenticating apparatue 210, the rest are masked. This is conveniently done by two opaque corner covers 229 and 230 that are permanently attached to the top wall 212 of the housing 211 as by flanges 231 and 232 extended through slots in the wall 212 and cemented to the underside of the wall 212. The masks 229 and 230 block all but the middle six reference characters 222, 223, 224, 225, 226 and 227.

Figure 14:
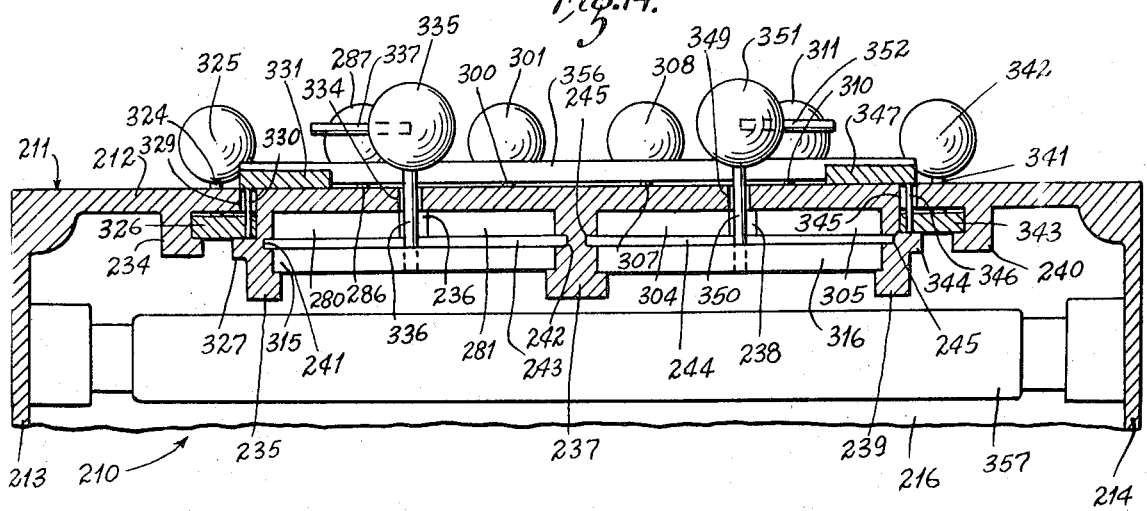
FIG. 14 is an enlarged sectional view along line 14—14 of FIG. 12.

As shown in FIGS. 13 and 14, there are a plurality of channel members 234, 235, 236, 238, 239 and 240 depending from the top wall 212 and extruded with the housing 211. The channel members 235 and 237 have ridges 241 and 242 in them between which a friction separator plate 243 is permanently mounted. A similar support plate 244 is permanently mounted between longtudinal ridges 245 in the channel members 237 and 239. The support plate 243 has a row of four holes 246, 247, 248, and 249 through it, and these are aligned with a row of four holes 250, 251, 252 and 253 through the top wall 212 of the housing 211. The plate 243 has another row of holes 254, 255, 256 and 257 through it aligned with a row of four holes 258, 259, 260 and 261 through the top wall 212. Similarly, there are four holes 262, 263, 264 and 265 through the other support plate 244 aligned with four holes 266, 267, 268 and 269 through the top plate 212 of the housing 211, and a row of four holes 270, 271, 272 and 273 through the support plate 244 aligned with four holes 274, 275, 276 and 277 through the top plate 212.

An encoding plate 280 is slidable on the friction separator plate 243 between the channel members 235 and 236. Another encoding plate 281 is slidable on the friction separator plate 243 between the channel members 236 and 237. Each encoding plate 280 and 281 has a plurality of holes 282 in it. The holes 282 are arranged in rows, each comprising two holes in two of four locations, thereby giving a 2-out-of-4 encoding. There are six possible variations in a 2-out-of-4 code four of which are repeated on the plates 280 and 281. There is a slot 285 above the encoding plate 280.

A shaft 286 attached to the encoding plate 280 extends through the slot 285, and a knob 287 is attached to the end of the shaft 286. The knob is slidable between ten positions 288, 289, 290, 291, 292, 293, 294, 295, 296, and 297, as represented by the numerical characters 0, 1, 2, 3, 4, 5, 6, 7, 8, 9. These characters correspond to the possible character designation 223 on the credit card 218. The space between the numerical character representations 288–297 is the same as the space between the rows of holes 282 on the encoding plate 280.

Another shaft 300 and knob 301 are attached to the encoding plate 281, the shaft extending through a slot 302. The knob 301 is also movable between the ten possible positions 288–297 as represented by the numerical characters zero through nine, and the spacing between the rows of holes 282 on the encoding plate 281 is the same as the spacing between the numerical character zero through nine, past which the knob 301 can be moved.

There are similar encoding plates 304 and 305 slidable on the other friction separator plate 244. Each of the encoding plates 304 and 305 has a plurality of holes 306 through it arranged in ten rows of two holes each, each row of two holes being in two of four possible locations in a total of ten rows with four repeated. A shaft 307 and a knob 308 are attached to the coding plate 304, the shaft 307 extending through a slot 309 in the top wall 212 of the housing 211. Also, a shaft 310 and knob 311 are attached to the encoding plate 305 with a shaft 310 extending through a slot 312 in the wall 212. The knobs 308 and 311 are slidable between the ten character positions 288–297 corresponding to the numerical designations zero through nine. The number selected by the positioning of the knob 308 corresponds to the number designation 225 on the credit card 218, and the position of the knob 311 is set according to the number designation 226 on the credit card 218.

A code plate 315 is slidably mounted between the channel members 235 and 237, and a similar code plate 316 is slidably mounted between the channel members 237 and 239. The code plate 315 has a plurality of rows of holes 317. Each row of holes 317 comprises two holes in two of four possible positions constituting a 2-out-of-4 code opposite to the 2-out-of-4 code represented by the holes 282 in the encoding plate 280. The rows of holes 317 are set forth six times over the length of the code plate 315 for a purpose to appear.

The code plate 315 also has another plurality of rows of holes 318. Each row of holes 318 also constitutes two holes in two of four possible positions, which are beneath the four possible positions of the holes 282 in the encoding plate 281. The 2-out-of-4 code represented by the holes 318 is opposite to the 2-out-of-4 code represented by the holes 282, and the rows of holes 318 are also set forth six times throughout the length of the code plate 315. The six representations of the codes are not necessarily in uniform order.

Similarly, the code plate 316 has a plurality of rows of holes 319 representing a 2-out-of-4 code opposite to the 2-out-of-4 code represented by the holes 306 in the encoding plate 304. The code plate 316 has another plurality of rows of holes 320 representing a 2-out-of-4 code opposite to the 2-out-of-4 code represented by the holes 306 in the encoding plate 305. The rows of holes 319 and 320 are also set forth six times each.

Since each of the encoding plates 280 and 281 have six possible variations, the two together have a total of thirty-six possible variations. Likewise, the two encoding plates 304 and 305 together have a total of thirty-six possible variations. For this, means are provided for moving each of the code plates 315 and 316 to any one of thirty-six different positions.

For the code plate 315, this shifting means comprises a slot 232 through the top wall 212 of the housing 211 with an operating knob 324 attached to a shaft 325 which extends through the slot 323. The shaft 325 is attached at its other end to an elongated rod 326 slidably mounted between the channel member 234 and a longitudinal shoulder 327 formed on the channel member 235. There is an elongated slot 329 through the top wall 212 of the housing 211 past which the rod 326 extends. The two posts 330 are attached to the rod 326 and extend upwardly through the slot 329. A plate 331 is fastened to the upper ends of the posts 330. The plate 331 has thirty-six different positions indicated on it by characters 332, such as letters of the alphabet A through Z and numerals zero through nine.

There is an elongated slot 334 through the top wall 212 of the housing 211. A knob 335 is attached to a post 336 which extends through the slot 334 and is fastened to the code plate 315 (the friction separator plate 243 terminates short of the slot 334). The knob 335 has a pointer 337 to make it easier for an operator to set the knob 335 opposite one of the characters A through Z and zero through nine on the plate 331. There may also be suitable complementary detent means between the knob 335 and the top wall 212 to yieldably stop the knob 335 opposite any given character 332.

Another slot 340 through the top wall 212 receives a post 341 to one of which is attached an operating knob 342. The other end of the post 341 is attached to an elongated rod 343 that is slidable between the channel 240 and an elongated shoulder 344 formed on the channel 239. An elongated slot 345 through the top wall 212 receives two posts 346, which are attached to the rod 343 and to the upper ends of which is attached a plate 347. The plate 347 also has thirty-six character representations 348 on it as represented by the letters A through Z and the numbers zero through nine.

There is a slot 349 in the top wall 212 through which a post 350 extends. An operating knob 351 is attached to the upper end of the post 350, and a pointer 352 extends from the operating knob 351 to facilitate stopping the operating knob opposite one of the letter characters 348.

There are transparent "standby" and "authorized" windows 354 and 355 snapped into holes through the top wall 212 of the housing 211. Separate lamps are positioned below the standby and authorized windows 354 and 355, the lamps being in a circuit such as the one shown in FIG. 9 or FIG. 10. The circuit includes a photocell 356 mounted above the top wall 212 over the holes 250–257 and a light source 357 mounted below the top wall 212 and directly beneath the photocell 356.

To operate the authenticating apparatus 210, the operator places the identification or credit card 218 on the top wall 212 with its corner stopped against and beneath the opaque masks 229 and 230, thereby blocking all but six identification characters 222–227. Next, the operator sets the knob 324 opposite the character 295 corresponding the character 227 which, in the illustrated example of FIG. 12, is the numeral 7. In sequence, the operator sets the knob 323 opposite the character 296 corresponding to the character 223 on the credit card, the knob 301 opposite the character 297 corresponding to the character 224 on the credit card 218, and the knobs 308, 311 and 342 opposite the characters 288, 289 and 290 corresponding to the characters 225, 226 and 227 on the credit card 218, respectively. Then, the holder of the identification card 218 orally transmits the two secret code letters, such as "NJ" and the knobs 335 and 352 are moved until their pointers 337 and 352 are opposite the characters "N" and "J," respectively, on the slide plates 331 and 347. If the holder is authorized to hold the card 218, the "authorized" window 355 illuminates. Otherwise, the "standby" window 354 is illuminated.

In this operation, the settings of the knobs 324 and 342 operate through the rods 326 and 343 to shift the dial plates 331 and 348 to any one of ten different positions each. The settings of the knobs 287 and 301 shift the encoding plates 280 and 281 to any one of ten different positions, thereby locating a row of holes 382 in line with the holes 250–253 in the top wall 212 and a row of holes 282 in line with the holes 254–257 in the top wall 212. The setting of the knobs 308 and 311 produces a similar setting for the encoding plates 304 and 305. Finally, the setting of the knobs 335 and 352 opposite the secret code characters 332 and 348 given by the card holder shifts the code plates 315 and 316.

Shifting of the code plate 315 locates a row of holes 317 and a row of holes 318 beneath the holes 250–257 in the top wall 212, and the shifting of the code plate 316 locates a row of holes 319 and a row of holes 320 below the holes 266–273 in the top wall 212. If the correct secret code assignments were given by the holder for the setting of the knobs 335 and 351, all the holes 281, 282, 306 and 307 in the encoding plates 280, 281, 304 and 305, below the holes 250–257 in the top wall 212 and between the light source 357 and the photocell 356, will be blocked, and the "authorized" window 355 will be illuminated. Any other setting will admit light through at least one hole and cause the "standby" window to be illuminated.

Another embodiment of the invention shown schematically in FIG. 17 shows a 2-out-of-5 encoded identification card 370 and its "opposite" 3-out-of-5 code plate 371 which are sensed by five contacts 372, 373, 374, 375 and 376 via grounded plates 377 and 378. The identification card 370 is made of high resistance material. The card 370 has two perforations 379 and 380 in two of five positions, and the contacts 373 and 376 are shown grounded through the perforations 379 and 380.

The code plate 371 has a plurality of rows of holes in it, each row comprising three holes or perforations in three of five positions, such as the perforations 381, 382, and 383. The code plate is movable by any of the means previously described in connection with other embodiments, and the locations of the holes is sensed by five contacts 385, 386, 387, 388, and 389. The contacts 381, 387 and 388 are shown grounded through the perforations in the 3/5 opposite code plate 371 which is also of high resistance material, such as nylon.

This 2/5 code arrangement can provide only ten variations but illustrates the method of operation for additional channels when using any constant ratio code such as the 3/7, 3/8 or 4/8 code. The sequence of operation is as follows. The identification card 370 is positioned between suitable guides 392 and 393 with its code holes 379 and 380 in position for its perforations to be sensed by the contacts 372–376. The code plate 371 is moved according to the holder's identification code as already described. Only one setting of the code plate 371 (of a possible ten settings for a 2-out-of-5 code) will cause all of the juncture points 396, 397, 398, 399, and 400 between the two sets of contacts 372–376 and 385–389 to be grounded. Only then will a supply potential 401 be prevented from forward biasing a transistor 402 through one or more of a bank of resistors 403, 404, 405, 406 and 407 and a bank of diodes 408, 409, 410, 411 and 412 via a resistor 413. The potential 414 will then reverse bias the transistor 402, allowing the relay 416 to deenergize and complete the circuit through a relay contact 417 which is used to provide a visual indication of the authorization. The resistors 403–407 provide the necessary drop for the potential 401 when returned to ground via the juncture points 396–400, respectively. The diodes 408–412 prevent the potential 414 from drawing current through the resistor 413 via any of the grounded contacts 372–376 and 385–389.

What is claimed is:

1. Apparatus for verifying the authority of a holder to possess an identification card which has identification character means on it representing a predetermined variation of a character code the character code having a plurality of variations, comprising a frame, movable wall means supported by the frame, the movable wall means having a code means on it representing a code which is opposite and complementary to the character code, the code means having a plurality of code variations only one of which compares in predetermined correspondence to the predetermined variation of the character code, the variations of the code means being arranged in a series along the movable wall means, means to move the movable wall means in proportion to an authorization code submitted by the holder, and means to sense variations between correspondence and lack of correspondence between the identification character means on the identification card and the code means on the movable wall means, said card having a plurality of separate identification character means on it, each representing a predetermined variation of a character code and wherein the movable wall means comprises separate coded walls corresponding to the separate identification character means.

2. The apparatus of claim 1 wherein the card has a stop on it located at one of several possible positions, and including means to vary the base for the authorization code submitted by the holder according to the location of the stop.

3. The apparatus of claim 2 wherein the last named means comprises means for shifting the relative starting position of the movable wall means according to the position of the stop.

4. Apparatus for verifying the authority of a holder to possess an identification card which has identification character means on it in the form of holes punched through the card representing a predetermined variation of a constant ratio character code the character code having a plurality of variations, comprising a frame, movable wall means supported by the frame, the movable wall means having a constant ratio code means thereon in the form of holes through the movable wall means, and representing a constant ratio code which is opposite and complementary to the constant ratio character code, the code means having a plurality of code variations only one of which compares in predetermined correspondence to the predetermined variation of the character code, the variations of the code means being arranged in a series along the movable wall means, means for moving the movable wall means in proportion to an authorization code submitted by the holder, and means to sense variations between correspondence and lack of correspondence between the identification character means on the identification card and the code means on the movable wall means, said card having a stop on it located at one of several possible positions and including means to vary the base for the authorization code submitted by the holder according to the location of the stop.

5. The apparatus of claim 4 wherein the means for moving the movable wall means includes means for moving the movable wall means in overlapping relationship to the identification card so as to cause a resultant variation of the code on the movable wall means to align with the identification character means on the card, and the sensing means includes a light source, means for directing light at the aligned holes, and light responsive means to sense the light or lack thereof passing through the overlapping code variations.

6. The apparatus of claim 4 wherein the sensing means includes a first set of electrical contacts associated with the character code, a second set of electrical contacts associated with the code on the movable wall means and electrical circuit means associated with the electrical contacts, the electrical circuit means and electrical contacts combining to sense variations between correspondence and lack of correspondence between the identification character means on the identification card and the code means on the movable wall means.

7. Apparatus for verifying the authority of a holder to possess an identification card which has identification character means on it representing a predetermined variation of a character code the character code having a plurality of variations, comprising a frame, a plurality of movable code plates mounted on the frame, one code plate for each character of the identification character means, each of the code plates having a first constant ratio code thereon having a plurality of code variations only one of which corresponds to the character to which that code plate is associated, the variations of the first constant ratio code being arranged in series along the code plates, means to select a variation of each first constant ratio code according to its associated identification character, a plurality of encoder plates having second constant ratio codes thereon which are opposite and complementary to the first constant ratio codes, each of the second constant ratio codes having a plurality of code variations only one of which compares in predetermined correspondence to the selected variation of each first constant ratio code, the variations of the second constant ratio code being arranged in series along the encoder plates, the encoder plates being movably mounted in relation to the code plates, means for selecting a variation in the second constant ratio code by moving the encoder plates as a function of an authorization code submitted by the holder, and means to compare the selected variations of the first constant ratio code with the second ratio code.

8. The apparatus of claim 7 including means for setting the base for the authorization codes submitted by the holder according to other identification characters on the card.

9. The apparatus of claim 7 wherein both the first constant ratio codes and the second constant ratio codes are represented by holes in the code plates and encoder plates and wherein the last named means comprises a light source means for directing light at a predetermined line of holes, and light responsive means to sense the light or lack thereof passing through the code variations on the predetermined line.

References Cited

UNITED STATES PATENTS

| 2,482,242 | 9/1949 | Brustman | 340—149A |
| 3,299,298 | 1/1967 | Schinner | 340—149A |
| 3,315,230 | 4/1967 | Weingart | 340—149A |
| 3,403,380 | 9/1968 | Welch | 340—149A |
| 3,404,259 | 10/1968 | Atkinson | 340—149A |

HAROLD I. PITTS, Primary Examiner

U.S. Cl. X.R.

179—2; 235—61.7; 250—219; 340—147